July 14, 1925.

B. B. PHILLIPS 1,546,250

CLAMP BAR FOR ELECTRIC WELDING MACHINES

Filed July 18, 1923  3 Sheets-Sheet 1

WITNESSES
Louis Goodman
E. N. Lovewell

Byron B. Phillips
INVENTOR

BY E. G. Siggers

ATTORNEY

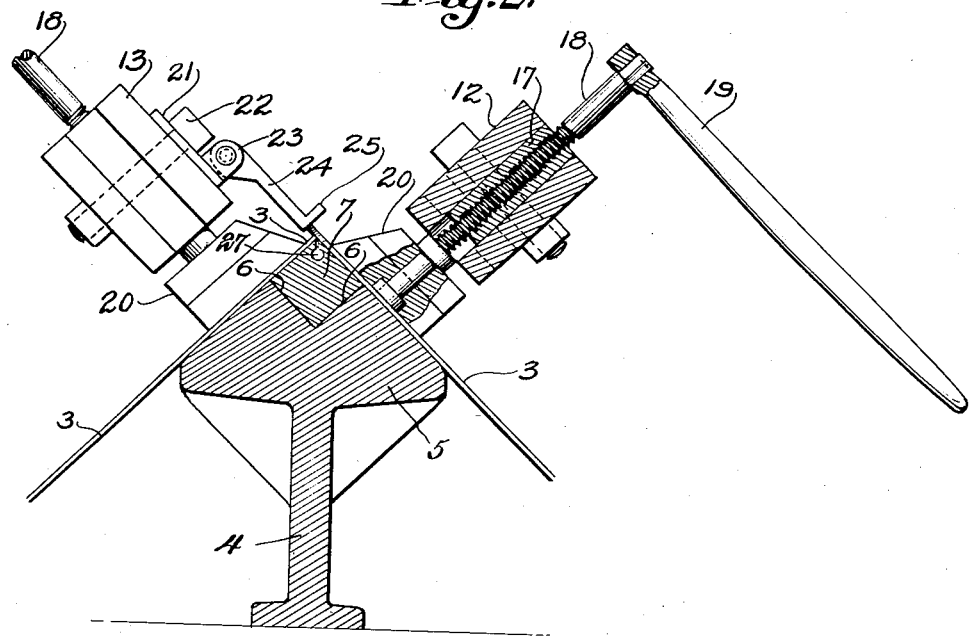

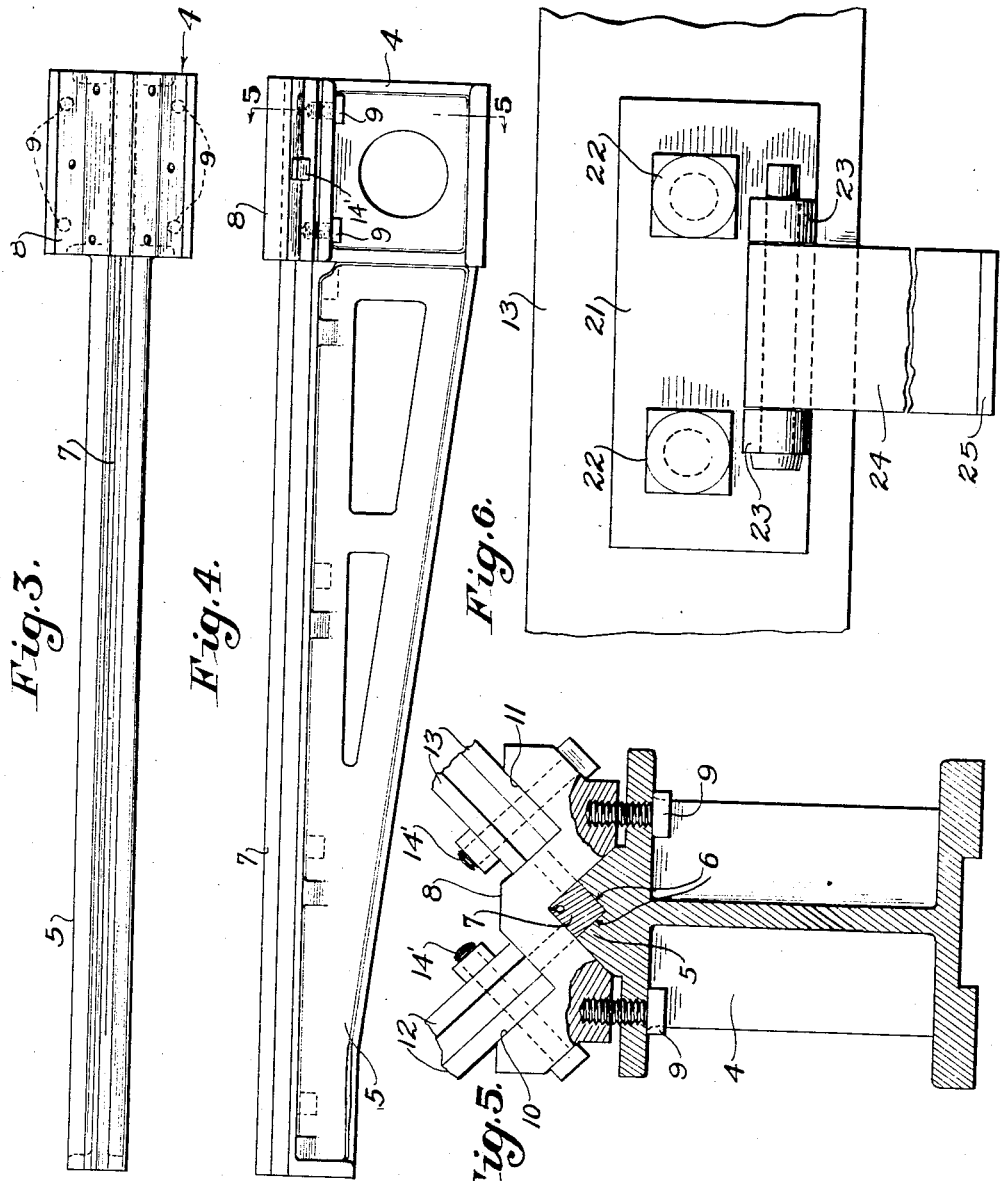

Patented July 14, 1925.

1,546,250

UNITED STATES PATENT OFFICE.

BYRON B. PHILLIPS, OF HUDSON, NEW YORK, ASSIGNOR TO GIFFORD-WOOD COMPANY, OF HUDSON, NEW YORK, A CORPORATION OF NEW YORK.

CLAMP BAR FOR ELECTRIC-WELDING MACHINES.

Application filed July 18, 1923. Serial No. 652,388.

*To all whom it may concern:*

Be it known that I, BYRON B. PHILLIPS, a citizen of the United States, residing at Hudson, in the county of Columbia and State of New York, have invented a new and useful Clamp Bar for Electric-Welding Machines, of which the following is a specification.

This invention relates to a clamp bar for electric welding machines, which is designed with special reference to the welding of galvanized material.

In attempting to weld galvanized material with welding machines as commonly constructed, it has been found that certain gases produced by the volatilization of the zinc expand or explode, and produce blow holes in the work which must be later patched up, thus causing a great deal of difficulty and resulting in imperfect work.

The present invention has been perfected with the object of overcoming this difficulty by the use of a clamp bar of novel construction, which will securely hold the material in place, bring its edges together, either in abutting or overlapping relation, and in which provision is also made for relieving the pressure of the gases formed during the welding, and for conducting them away from the work by either a natural or a forced draft. While the action of the above mentioned gases is undoubtedly chemical, the deleterious effect on the properties of the weld is entirely physical, and this effect is entirely eliminated by the present invention.

The invention is adaptable not only to metal electrode welding, wherein the metal electrode is fused into the weld and actually builds up and adds to the material, but also to carbon electrode welding, wherein it is necessary to provide a backing directly underneath the weld. It may be applied either to a corner weld, or to a straight seam weld, where the edges abut in the same plane or overlap.

The principles embodied in the invention, and the structure by means of which they are carried out, will be more specifically described in connection with the accompanying drawings, which illustrate the same adapted to the welding of the corner seam of a rectangular can body.

In the drawings:

Figure 2 is a view, partly in section and partly in elevation of the clamping devices.

Figure 3 is a plan view of a clamping bar and its supporting means.

Figure 4 is a side elevation of the same.

Figure 5 is an end view of the same, parts being shown in section on the line 5—5 of Figure 4.

Figure 6 is a detail view of a pivoted gage finger, which may be used in connection with the invention.

Figure 9 is a fragmentary end elevation showing a clamp bar adapted to carbon electrode welding.

Figure 10 is a side elevation of the same.

Figure 11 is a view similar to Figure 9, but showing a modified construction.

Figure 12 is a fragmentary side elevation of the form shown in Figure 11.

Figure 13 is a fragmentary end elevation showing the same form of clamp bar which is shown in Figure 2.

Figure 14 is a side elevation of the same with a part shown in section.

Figure 15 is a fragmentary end elevation showing still another modification.

Figure 16 is a side elevation of the same with a part shown in section.

Figure 1:
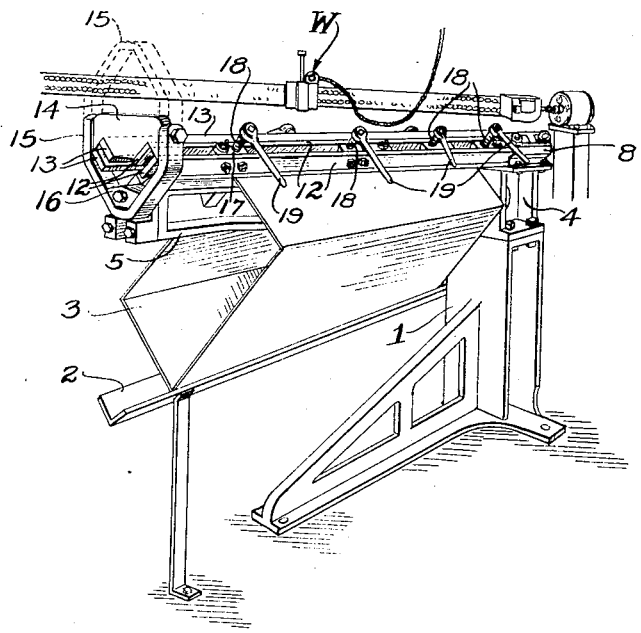
Figure 1 is a perspective view of a welding machine embodying my invention.

The machine includes a main base frame 1, of any suitable construction, connected with which is a trough 2, or the like, for supporting the lower end of the can body 3, on which the work is to be performed. A block 4 is firmly secured to the base frame 1, and carries a forwardly extending supporting arm 5, which is provided on its upper side with a suitable V-shaped channel 6 adapted to receive and support a clamp bar 7. This bar, as shown, is adapted for supporting the metal, whose edges are to be welded together to form a corner seam.

One end of the bar 7 is suitably clamped to the block 4 by means of a top block 8, which is secured by screws 9, or other suitable means. The top block 8 has two V-shaped channels 10 and 11 formed in its upper face on either side of the bar 7, and the upper clamping bars 12 and 13 are secured at one end in these channels by means of bolts 14', or other suitable means. The bars 12 and 13 extend in parallel relation with the upper faces of the arm 5 and clamp bar 7, and their front ends are secured together by a block 14 on which a yoke 15 is pivotally carried. This yoke is adapted to engage a clamp block 16 carried at the end of the arm 5, so that the bars 12 and 13 may be held rigidly in working position. Suitable blocks 17 are secured to the respective bars 12 and 13 and threadedly receive clamping screws 18, which may be operated by handles 19 to adjust the upper clamping elements 20 tightly against the sides of the metal body 3, to firmly hold the same in proper position for the welding operation (Fig. 2). The welding means used for the operation may be of any type desired, and is indicated conventionally at W in Figure 1.

Any preferred means may be used for positioning the work. In Figures 2 and 6, I have shown a plate 21 secured by bolts 22 to the bar 13, and having ears 23 in which is pivotally supported a gage finger 24 having at its lower end a flange 25 against which one edge of the metal may be abutted.

The clamp bar 7, on which are supported the edges to be welded is preferably made from copper or brass. In the form shown in Figures 2, 13 and 14, the upper edge 26 forms a backing directly under the weld, and is adapted for use with a carbon electrode. Just beneath the edge 26 is a longitudinal bore 27 from end to end of the bar, and numerous minute ducts 28 lead from the edge 26 to the bore, so that the gases may escape.

In the modification shown in Figures 9 and 10, the bar 7ª is provided with a continuous upper edge 26ª forming a continuous backing adapted to be used with a carbon electrode, and the sides of the bar leading from the edge 26ª form a depression or channel 27ª at each side, which forms an outlet for the gases, which is substantially equivalent to the bore 27.

In the modification shown in Figures 11 and 12, the bar 7ᵇ is also provided with a continuous upper edge 26ᵇ, with a single channel 27ᵇ into which the gases may escape. For further facilitating the escape of the gases, transverse channels 29 are provided which lead into corresponding channels 30 formed on the face of the supporting arm 5ᵇ.

In the form shown in Figures 15 and 16, the bar 7ᶜ has an upper edge 26ᶜ adapted to form a backing for use with a carbon electrode. An outlet for the gases into the bore 27ᶜ is provided by transverse slots 28ᶜ.

Figure 7:
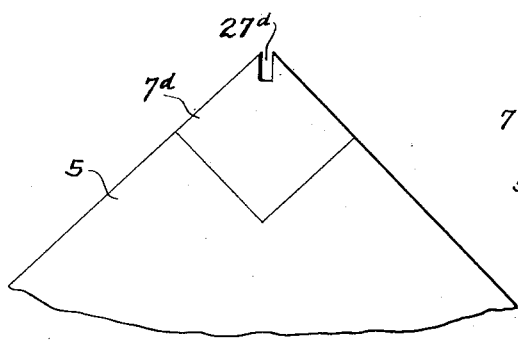
Figure 7 is a fragmentary end view showing a clamp bar adapted to metal electrode welding.
Figure 8:
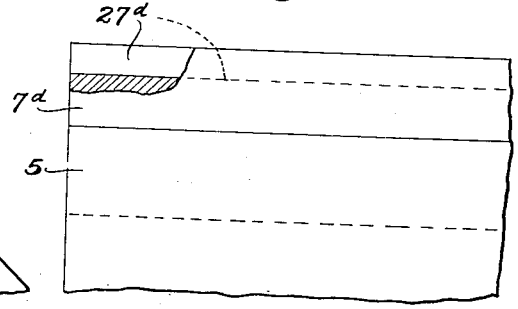
Figure 8 is a side elevation of the same with a portion broken away.

In the form shown in Figures 7 and 8, which is especially adapted for metal electrode welding which does not require a backing immediately underneath the weld, the bar 7ᵈ is provided with a central channel 27ᵈ formed in its upper edge into which the gases may freely escape.

When the seam to be welded is of considerable length, the gases may tend to accumulate within the bore and ducts, and it may therefore be advisable in such cases to connect a compressed air hose 31, as shown in Figures 13 to 16 inclusive, to one end of the bore, so that a forced draft may be created from one end thereof to the other. This will also prevent the sublimation of the zinc and clogging of the ducts. Under other circumstances a natural draft through the duct or channel would suffice.

While I have illustrated the invention in connection with the welding of corner seams on rectangular can bodies, it is to be understood that the invention is adapted to be used in connection with any welding operation, either with metal or carbon electrode, with corner weld or a straight seam weld, with the edges abutting or overlapping. Other modifications may also be made in size, form and arrangement of the various ducts and channels without sacrificing any of the advantages of the invention, and it is my intention to include all such modifications within the scope of the appended claims.

What is claimed is:

1. In a welding machine, the combination of a clamp bar, means for supporting the same, and means cooperating with said bar for clamping the material to be welded, said bar being provided with a channel beneath and in communication with the space where the welded material hardens for permitting the escape of gases formed during the welding process.

2. In a welding machine, the combination of a suitably supported metallic clamp bar, means for supporting the same, and means cooperating with said bar for clamping the material to be welded, said bar forming a backing immediately beneath and in contact with the point to be welded, said bar being provided with a channel beneath and in communication with said point for conducting away the gases formed during the welding process.

3. In a welding machine, the combination of a metallic clamp bar suitably supported, means cooperating with said bar for clamping the material to be welded, said bar being provided with a channel in communication with the welding point, and means for creating a forced draft through the channel to conduct away the gases formed during the welding process.

4. In a welding machine, the combination of a clamp bar, an arm for supporting the same, means for removably securing the bar to said arm, means cooperating with the bar and arm for clamping the material to be welded, said bar being provided with a channel spaced from but in communication with the welding point for permitting the escape of gases formed during the welding process.

5. In a welding machine, the combination of a clamp bar, an arm for supporting the same, means for removably securing the bar to said arm, and means cooperating with the bar and arm for clamping the material to be welded, said bar forming a continuous backing immediately beneath and in contact with the point to be welded, and having a channel in communication with the welding point for permitting the escape of gases during the welding process.

6. In a welding machine, the combination of a metallic clamp bar, an arm having a channel for receiving and supporting the bar, means for removably securing the bar in the channel, means cooperating with the bar and arm for clamping the material to be welded, said bar forming a backing immediately beneath the point to be welded and having a channel in communication with the welding point, and means for creating a forced draft therethrough for conducting away the gases formed during the welding process.

7. In a welding machine, the combination of a metallic clamp bar suitably supported, means cooperating with said bar for clamping the material to be welded, said bar having an edge which forms a backing immediately beneath the point to be welded, said bar having a longitudinal channel spaced from said edge and having ducts leading from the edge to the channel for conducting away the gases formed during the welding process.

8. A clamp bar for welding machines having longitudinal faces adapted to support the material to be welded, and having a longitudinal channel spaced from but in communication with the point where the welding takes place for conducting away the gases formed during the welding process.

9. A metallic clamp bar for welding machines having longitudinal faces meeting in a substantially continuous straight edge, and having a longitudinal channel spaced from said edge with a series of ducts leading from the edge to the channel.

In testimony, that I claim the foregoing as my own, I have hereto affixed my signature.

BYRON B. PHILLIPS.